United States Patent [19]
Wenzel et al.

[11] Patent Number: 5,433,066
[45] Date of Patent: Jul. 18, 1995

[54] VEHICLE FRAME AND CUTTER ASSEMBLY LIFTING MECHANISM FOR RIDING LAWN MOWER

[75] Inventors: Philip Wenzel, Vernon Center; David Giere, Canastota, both of N.Y.

[73] Assignee: Ferris Industries, Inc., Vernon, N.Y.

[21] Appl. No.: 258,325

[22] Filed: Jun. 10, 1994

[51] Int. Cl.6 .................... A01D 34/64; A01D 34/72
[52] U.S. Cl. ...................... 56/14.7; 56/17.1; 56/DIG. 22
[58] Field of Search ............ 56/11.3, 14.7, 15.2, 56/17.1, DIG. 22

[56] References Cited

U.S. PATENT DOCUMENTS

| | | | |
|---|---|---|---|
| 3,315,759 | 4/1967 | Bohlen | 180/6.24 |
| 3,550,364 | 12/1970 | Musgrave | 56/15.8 |
| 3,654,749 | 4/1972 | Ostergren et al. | 56/DIG. 22 X |
| 3,771,296 | 11/1973 | Sorenson et al. | 56/7 |
| 3,925,970 | 12/1975 | Rusco | 56/14.7 |
| 4,120,136 | 10/1978 | Rose | 56/17.1 |
| 4,679,382 | 7/1987 | Saruhashi et al. | 56/10.1 |
| 4,787,195 | 11/1988 | Wenzel | 56/11.1 |
| 4,840,020 | 7/1989 | Oka | 56/15.2 |
| 4,984,419 | 1/1991 | Sampei et al. | 56/202 |
| 5,127,215 | 7/1992 | Wenzel | 56/11.1 |

Primary Examiner—David J. Bagnell
Attorney, Agent, or Firm—Harris Beach & Wilcox

[57] ABSTRACT

An improved vehicle frame and cutter assembly lifting mechanism for a riding lawn mower. The frame includes a pair of oppositely opposed support rails extending along a substantial portion of the vehicle frame, a rear support member fixedly secured to the rear end of each of the support rails, a front support member fixedly secured to the front end of each of the support rails, a rear motor deck rotatably connected to the rear support member, a front wheel assembly connected to the front support member, a rear wheel assembly connected to said rear motor deck, an articulating pantograph type lifting mechanism for supporting a mower cutter assembly, and an actuator connected to the articulating pantograph type lifting mechanism for extending and retracting the mower cutter assembly between a cutting position proximate ground level and a fully retracted position. The rear motor deck is provided with a pair of extension arms which are secured to a frame axle that is rotatably retained within the rear support member. The mower is also provided with a kill switch assembly that disengages an electric clutch to remove drive power from the cutting blades when the mower cutter assembly reaches a predetermined height above ground level.

11 Claims, 6 Drawing Sheets

VEHICLE FRAME AND CUTTER ASSEMBLY LIFTING MECHANISM FOR RIDING LAWN MOWER

BACKGROUND OF THE INVENTION

1. Field of the Invention

This invention relates in general to lawn mowers and, in particular, to riding lawn mowers having a cutter assembly between the front and rear wheels of the mower. More specifically, but without restriction to the particular embodiment hereinafter described in accordance with the best mode of practice, this invention relates to a vehicle frame and an articulateable pantograph mechanism for lifting a mower cutter assembly above the center of the wheels of a riding lawn mower.

2. Discussion of the Related Art

The art of riding lawn mowers having a cutter assembly positioned between the front and rear wheels, has been contributed to by a number of prior riding movers. These include, for example, the mowers disclosed in U.S. Pat. No. 3,550,364 which issued to O. Musgrave on Dec. 29, 1970 and U.S. Pat. No. 4,679,382 issued to Saruhashi et al. Jul. 14, 1987. The riding mowers disclosed in these patents typify prior riding lawn mowers which include a frame or chassis, rear and front wheel assemblies, a drive motor commonly engaged with the rear wheel assembly to provide drive power thereto, a steering mechanism linked to the front wheel assembly, an operator's seat to place an operator of the mower within easy reach of the mower's controls, and lastly, a cutter assembly located between the front and rear wheel assemblies.

There have been proposed various prior lifting mechanisms for moving the cutter assembly from an extended position for cutting the lawn over which the mower is driven to a fully lifted or retracted position. The cutter assembly is typically retracted when the mower is driven from one cutting area to another. The retracted cutter assembly is thus positioned to avoid hitting obstacles as the mower is driven from one location to another. Such obstacles typically include, for example, curbs when the mower is being employed to cut lawn on island or median sections in a landscaped area including parking lots. Similar variations in ground level are encountered in municipal use of lawn mowers along roadsides and in park or camping areas.

One ever present design consideration in the manufacturing of riding lawn mowers, is vehicle stability. Generally, as the frame and wheel axles are positioned lower to the ground, vehicle stability increases. This design consideration is in conflict with the objective of retracting the cutter assembly as high as possible above ground level. Prior riding lawn mowers, as exemplified by those discussed above, have handled this problem by providing the mower frame with relatively large wheels and a retracting mechanism that lifts the cutter assembly to a height approximately level with the wheel axles. These riding lawn mowers thus sacrifice vehicle stability for cutter assembly clearance. Prior hereto, there has not been proposed a low profile riding lawn mower including relatively small wheels while proving maximum cutter assembly clearance.

OBJECTS AND SUMMARY OF THE INVENTION

It is, therefore, an object of the present invention to improve riding lawn mowers.

Another object of this invention is to maximize cutter assembly clearance when the cutter assembly of a riding lawn mower is moved into a fully retracted position.

It is a further object of the present invention to employ relatively small wheels in a riding lawn mower to provide increased stability to the mower.

Still another object of the present invention is to employ relatively small wheels in a riding lawn mower to provide increased stability to the mower while maximizing cutter assembly clearance when the cutter assembly of the lawn mower is moved into a fully retracted position.

It is still a further object of the present invention to employ a pantograph type lifting mechanism in a riding lawn mower to lift the cutter assembly of the mower to a fully retracted position above the front and rear axles of the mower.

Yet another object of the present invention is to articulate the vehicle frame of a riding lawn mower so that the frame changes shape to receive the mower cutter assembly as the cutter assembly is lifted into a fully retracted position that maximizes clearance between the cutter assembly and ground level.

An additional object of the present invention is to disengage drive power to the cutting blades in the cutter assembly of a riding lawn mower at a predetermined height above ground level as the cutter is moved from a cutting position to a fully retracted position.

These and other objects are attained in accordance with the present invention wherein there is provided an improved vehicle frame for a riding lawn mower. According to one aspect of this invention, the present mower frame includes a pair of oppositely opposed support rails extending along a substantial portion of the vehicle frame, a rear support member fixedly secured to the rear end of each of the support rails, a front support member fixedly secured to the front end of each of the support rails, a rear motor deck rotatably connected to the rear support member, a front wheel assembly connected to the front support member, a rear wheel assembly connected to said rear motor deck, an articulating pantograph type lifting mechanism for supporting a mower cutter assembly, and an actuator connected to the articulating pantograph type lifting mechanism. The lifting mechanism extends and retracts the mower cutter assembly relative to the vehicle frame so that the mower cutter assembly is movable from a cutting position proximate ground level to a fully retracted position above the rear axle and central hubs of the front wheels.

In accordance with another aspect of the present invention, the rear motor deck is provided with a pair of extension arms which are secured to a frame axle that is rotatably retained within the rear support member. In this manner, when the actuator is activated to retract the cutter assembly, the vehicle frame changes shape by allowing the motor deck to rotate downwardly. This downward rotation in turn, allows the cutter assembly to be fully retracted above the center of the mower wheels. According to yet another aspect of this invention, the present mower is provided with a kill switch assembly that disengages an electric clutch to remove drive power from the cutting blades when the mower cutter assembly reaches a predetermined height above ground level as it is being moved toward the fully retracted position.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing (with like reference numerals indicating like components throughout) wherein.

DETAILED DESCRIPTION OF A PREFERRED EMBODIMENT

Figure 1:
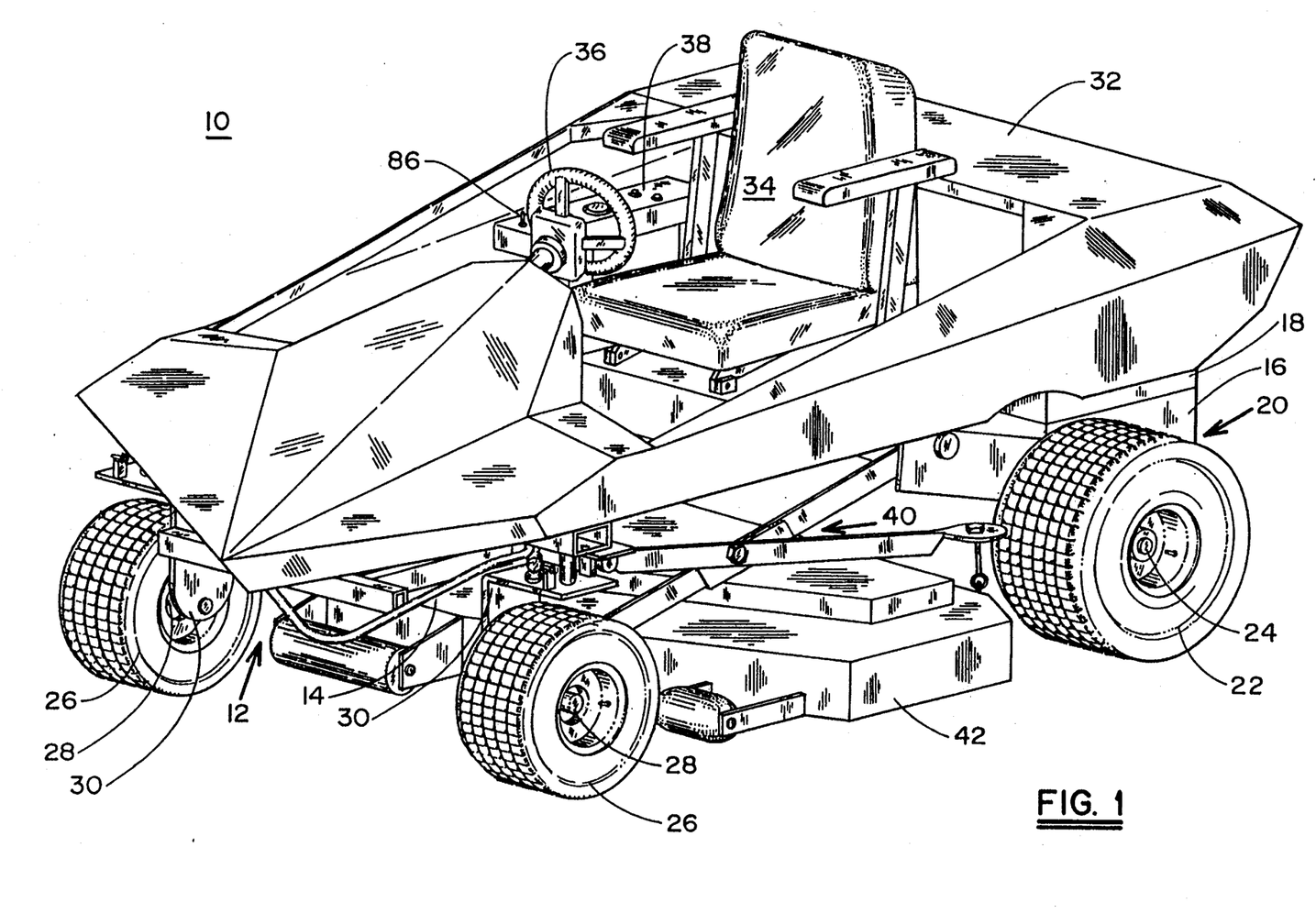
FIG. 1 is a perspective view of a riding lawn mower incorporating the lifting mechanism of the present invention.

Referring initially to FIG. 1, there is shown a riding lawn mower 10 in accordance with the present invention. The lawn mower 10 includes a vehicle frame generally referenced 12 which supports a front wheel assembly 14 and a rear motor deck 16. The rear motor deck 16 is rotatably secured to the vehicle frame 12 in a manner which will be described in further detail below. The rear motor deck supports a drive motor 18 on its top surface and further supports a rear wheel assembly 20. The rear wheel assembly 20 includes rear wheels 22 which are mounted on rear axle 24. The front wheel assembly 14 includes a pair of front wheels 26 which each have a central hub 28. Each of the central hubs 28 of the front wheels 26 is secured to an L-shaped bracket 30, which in turn is connected to the front wheel assembly 14 and the steering mechanism of the lawn mower. The steering mechanism of the riding lawn mower 10 is not within the scope of the present invention. A steering mechanism for such a riding lawn mower, however is fully disclosed in applicant's co-pending application Ser. No. 08/241,130 filed currently herewith, entitled "Steering Mechanism for Four Wheel Lawn Mower" and assigned to the assignee of the present invention.

The riding lawn mower 10 also includes a vehicle body 32 and an operator's chair or seat 34 which is located on the riding lawn mower 10 to put an operator seated therein in easy reach of a steering wheel 36 and a control console 38. In accordance with one aspect of this invention, the riding lawn mower 10 includes an articulating pantograph type lifting mechanism generally referenced 40 which will be described in further detail below. The lifting mechanism 40 supports a mower cutter assembly 42. The lifting mechanism 40 may be extended and retracted by an actuator 44 best shown in FIGS. 3 and 4.

Figure 2:
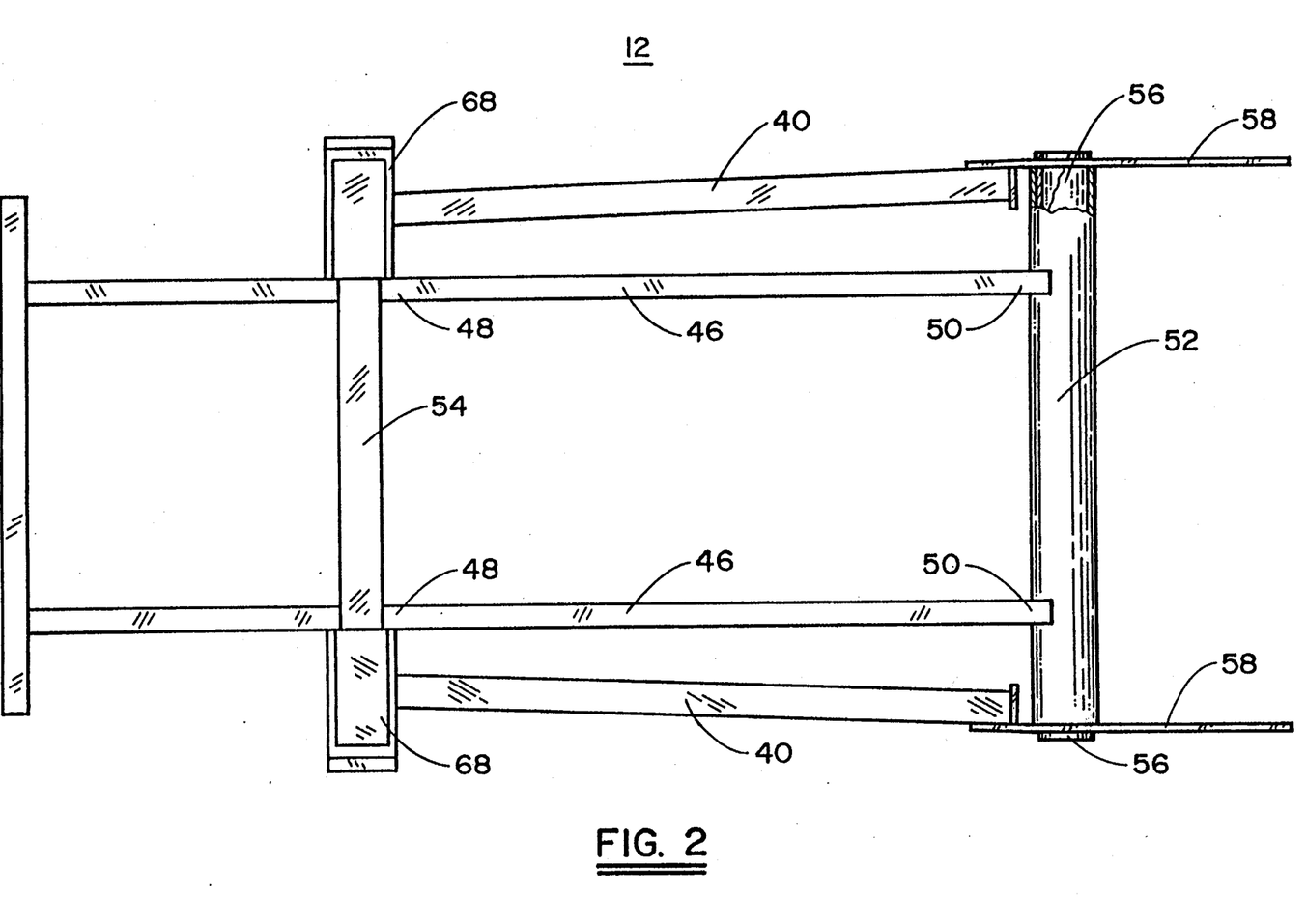
FIG. 2 is an isolated plan view of the vehicle frame employed in conjunction with a riding lawn mower in accordance with the present invention.

The vehicle frame 12 employed in conjunction with the riding lawn mower 10 is shown in an isolated view in FIG. 2. The vehicle frame 12 includes a pair of oppositely opposed support rails 46-46 which extend along a substantial portion of the vehicle frame 12. Each of the rails 46 includes a front end 48 and a rear end 50. As shown in FIG. 2, each of the rear ends 50 of the support rails 46 is fixedly secured to a rear support member 52 while the front ends 48 of the support rails 46 are connected to a front support member 54. The rear support member 52 contains frame axle 56 which is rotatably contained within the rear support member 52 and extends beyond the ends thereof as shown in FIG. 2. Each end of the frame axle 56 is welded to a side extension arm 58. The rear portion of the extension arm 58 are secured to the motor deck 16 as shown in FIG. 1 while the front portion of the side extension arms 58 are each secured to a corresponding portion of the pantograph type lifting mechanism 40.

Figure 3:
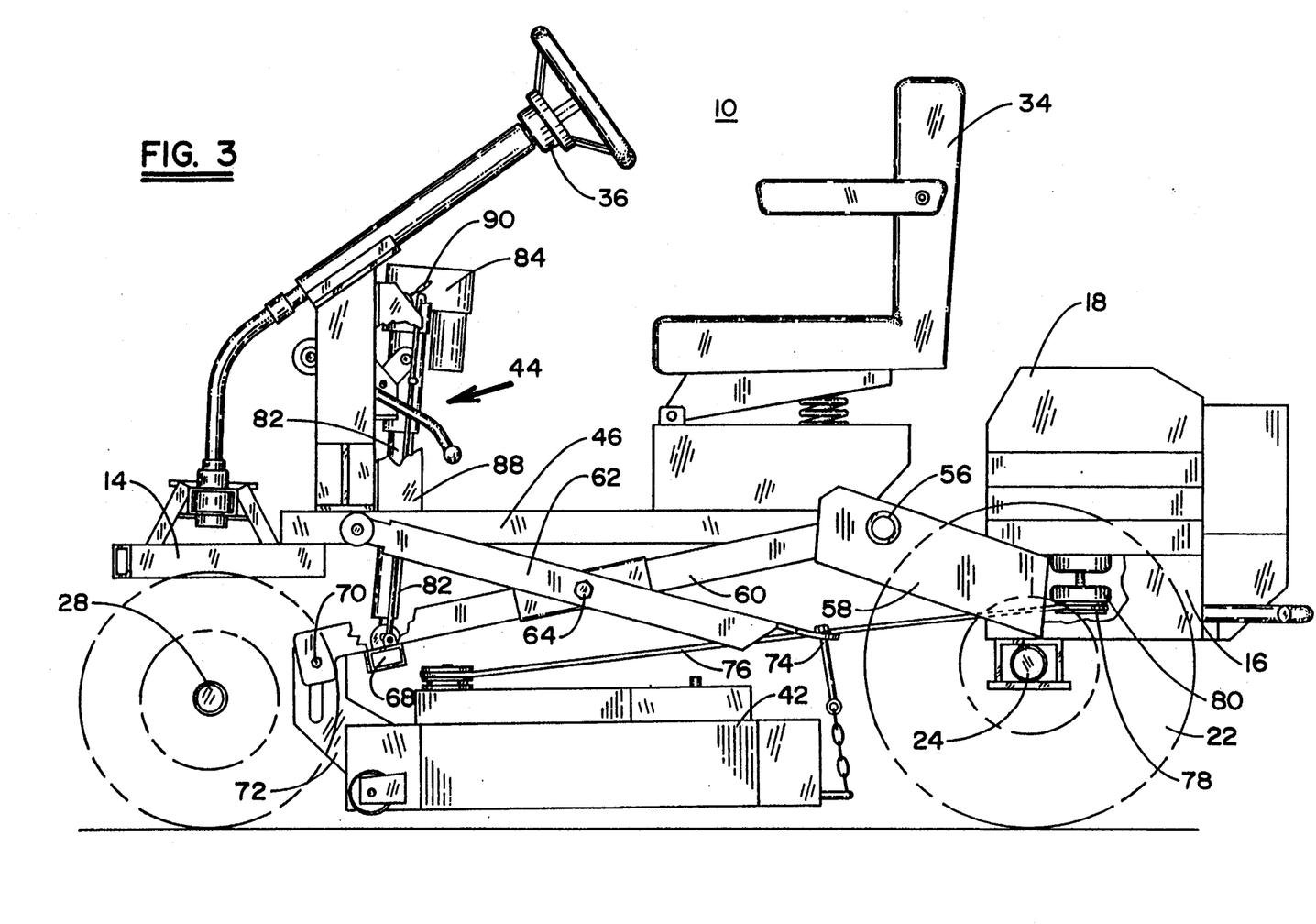
FIG. 3 is a side elevation view of the present riding lawn mower showing the cutter assembly in a lowered cutting position.
Figure 4:
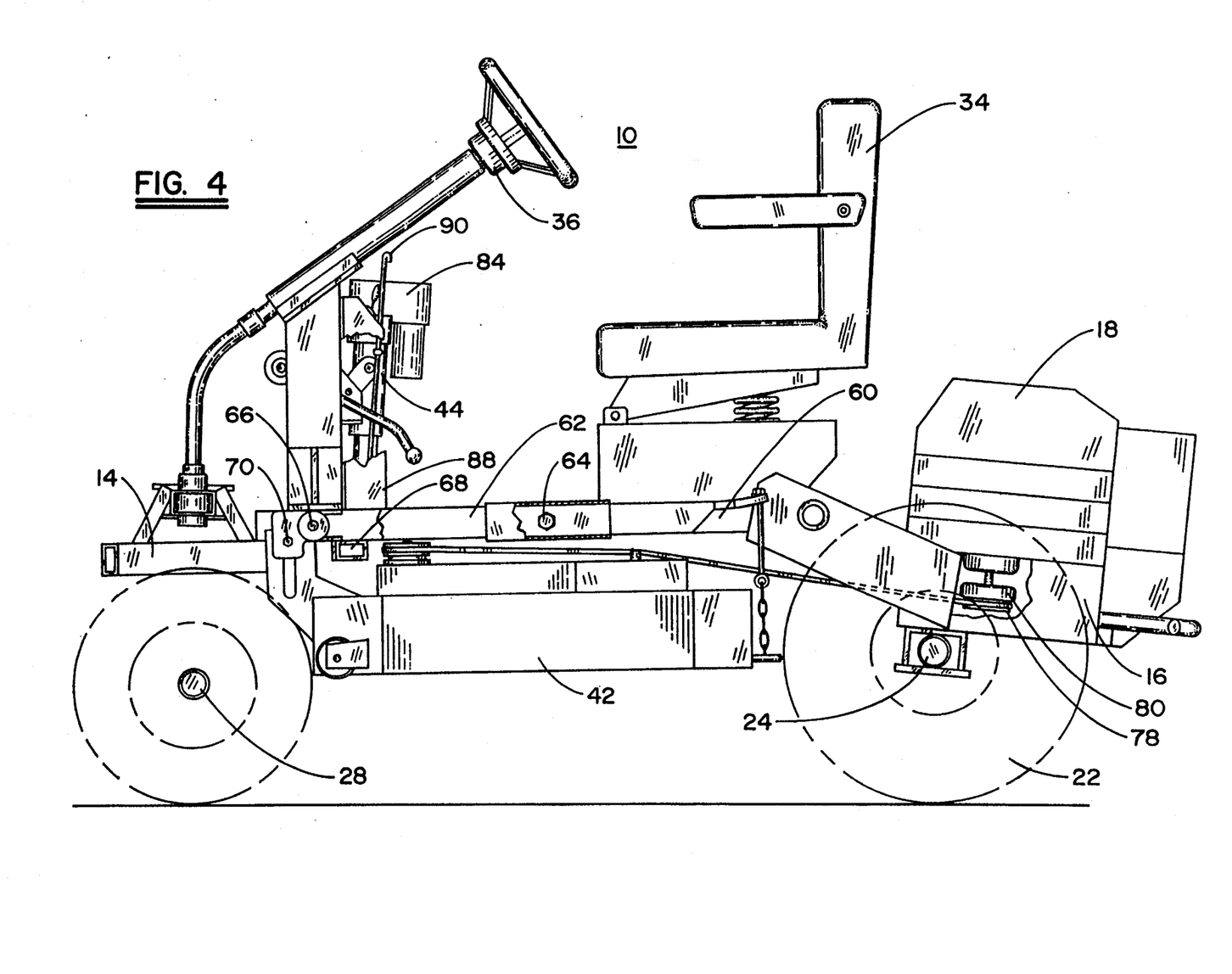
FIG. 4 is a view similar to FIG. 2 showing the mower cutter assembly in a fully retracted position.

Referring now to FIG. 3, there is shown a schematic representation of the left side of the riding mower 10. The lifting mechanism 40 will now be described with reference to FIG. 3, it being understood that the lifting mechanism 40 includes a left portion and a right portion which are identical for purposes of the present disclosure. Each side Of the lifting mechanism 40 includes a rear to front rod 60 and a front to rear rod 62. The two rods 60 and 62 are hinged together at their midpoints by a hinge bolt 64. The upper end of the rear to front rod 60 is rigidly secured to the side extension arm 58 as shown in FIGS. 2 and 3. The upper end of the front to rear rod 62 is rotatably secured to the support rail 46 by a hinge pin 66. The lower ends of the right and left rear to front rods 60 are linked together by a drive bar 68 and a connecting rod 70. Positioned along the center of the connecting rod 70 is a front bracket 72 which links the front end of the front portion of the lifting mechanism 40 to the front of the mower cutter assembly 42 as shown in FIGS. 3 and 4. The lower ends of the front to rear rods 62 include a bolt and chain fastener 74 which links the mower cutter assembly 42 to the lifting mechanism 40. In this manner, the mower cutter assembly 42 is suspended from the lifting mechanism 40 at the ends of the rods 60 and 62 by means of the front bracket 72 and the bolt and chain connector 74. The mower cutter assembly includes a set of cutter blades (not shown) which are driven by a drive belt 76. The drive belt 76 is in turn connected to a drive pulley 78 which is controlled by an electric clutch 80 connected to an output shaft from the drive motor 18.

The actuator 44 will now be described in further detail with reference initially to FIG. 3. The actuator 44 is preferably formed from an electric worm screw crank which includes a telescoping shaft 82 connected at its lower end to the drive bar 68 as shown in FIG. 3. The actuator 44 includes an electric motor assembly 84 which when activated by a control switch 86 (FIG. 1) either extends or retracts the telescoping shaft 82 so that the lifting mechanism 40 can be lowered to the cutting position approximate group level shown in FIG. 2 or raised to a fully retracted position which is above the rear axle 24 and central hubs 28 as shown in FIG. 4. The actuator 44 for the lifting mechanism 40 may alternatively include a hand activated worm screw crank which would function in a similar manner to the electric crank shown in FIGS. 3 and 4. In accordance with another aspect of the present invention, when the actuator 44 is activated to move the mower cutter assembly 42 from the cutting position shown in FIG. 3 to the fully retracted position shown in FIG. 4, the side extension arms 58 will rotate downwardly as the frame axle 56 rotates clockwise within the rear support member 52 by virtue of the upward movement of the rear to front rods 60. In this manner, the rear motor deck 16 and the drive motor 18 are moved from the substantially horizontal position shown in FIG. 3 to the lower position shown in FIG. 4. As the center of gravity of the mower cutter assembly 42 is moved upward, the center of gravity of the drive motor 18 and the rear motor deck 16 is lowered to maintain riding stability of the riding lawn mower 10. As represented in FIG. 1, the rear wheels 22 and the front wheels 26 are relatively small placing the rear axle 24 and the central hubs 28 of the front wheels 26 relatively low to the ground. This positioning of the front and rear wheel assemblies provides added stability to the riding lawn mower 10. To maintain this enhanced stability of the lawn mower 10, the frame 12 is provided with the above discussed rear support member 52 and frame axle 56 to maintain the riding stability of the mower between the two positions shown in FIGS. 3 and 4. The present lawn mower 10 maximizes rider stability while also providing maximum clearance between the cutter mower assembly 42 and the end ground level as shown in FIG. 4. Thus, any obstacles such as curbs that the lawn mower 10 is driven over, will easily pass under the mower cutter assembly 42 when in its fully retracted position shown in FIG. 4. In this position, the mower cutter assembly 42 is lifted above the rear axle 24 and the central hubs 28 of the front wheels.

Figure 5:
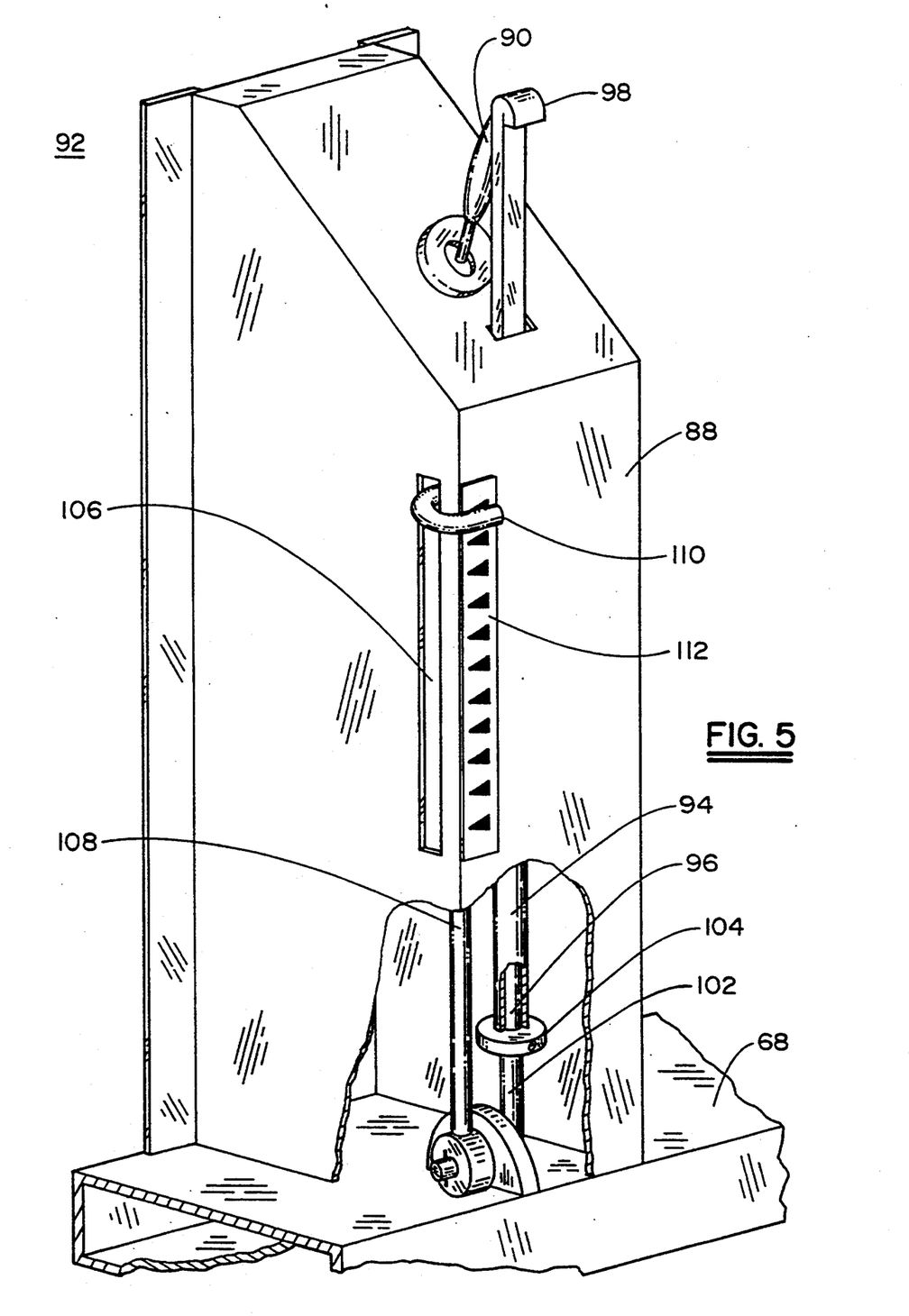
FIG. 5 is a perspective view of the kill switch assembly employed with the operation of a riding lawn mower according to the present invention.

With reference again to FIGS. 3 and 4, it is shown that the actuator 44 for the lifting mechanism 40 is substantially contained within a housing 88. The top portion of the housing 88 includes an electric lever switch 90 which is electrically connected to the electric clutch 80. The housing 88 also includes a kill switch assembly or switch actuator assembly 92 as best shown in FIG. 5. The kill switch assembly 92 is provided to disengage the electric clutch 80 when the mower cutter assembly 42 reaches a predetermined height above ground level as it travels from the cutting position shown in FIG. 2 to the fully retracted position shown in FIG. 4. The height at which the electric clutch 80 is disengaged, is made adjustable by the kill switch assembly 92. The kill switch assembly 92, as shown in FIG. 5, includes a J-shaped tube member 94 that includes an open lower end 96 and a J-shaped end 98 positioned immediately proximate the electric lever switch 90. The kill switch assembly 92 also includes a plunger rod 102 which is connected at its lower end to the drive bar 68. The upper portion of the plunger rod is contained within the tube member 94 as shown in FIG. 5. An adjustable collar 104 is positioned around the plunger rod 102 and is secured to the plunger rod by any suitable means such as, for example, a set screw. The housing 88 is further provided with a horizontal slit 106 while the drive bar 68 further includes a height indicator bar 108 which includes at its distal end an indicator head 110. The exterior surface of the housing 88 is provided with height indicia 112 which informs an operator of the riding lawn mower 10 of the height of the mower cutter assembly 42 above ground level any time during operation of the mower.

Figure 6:
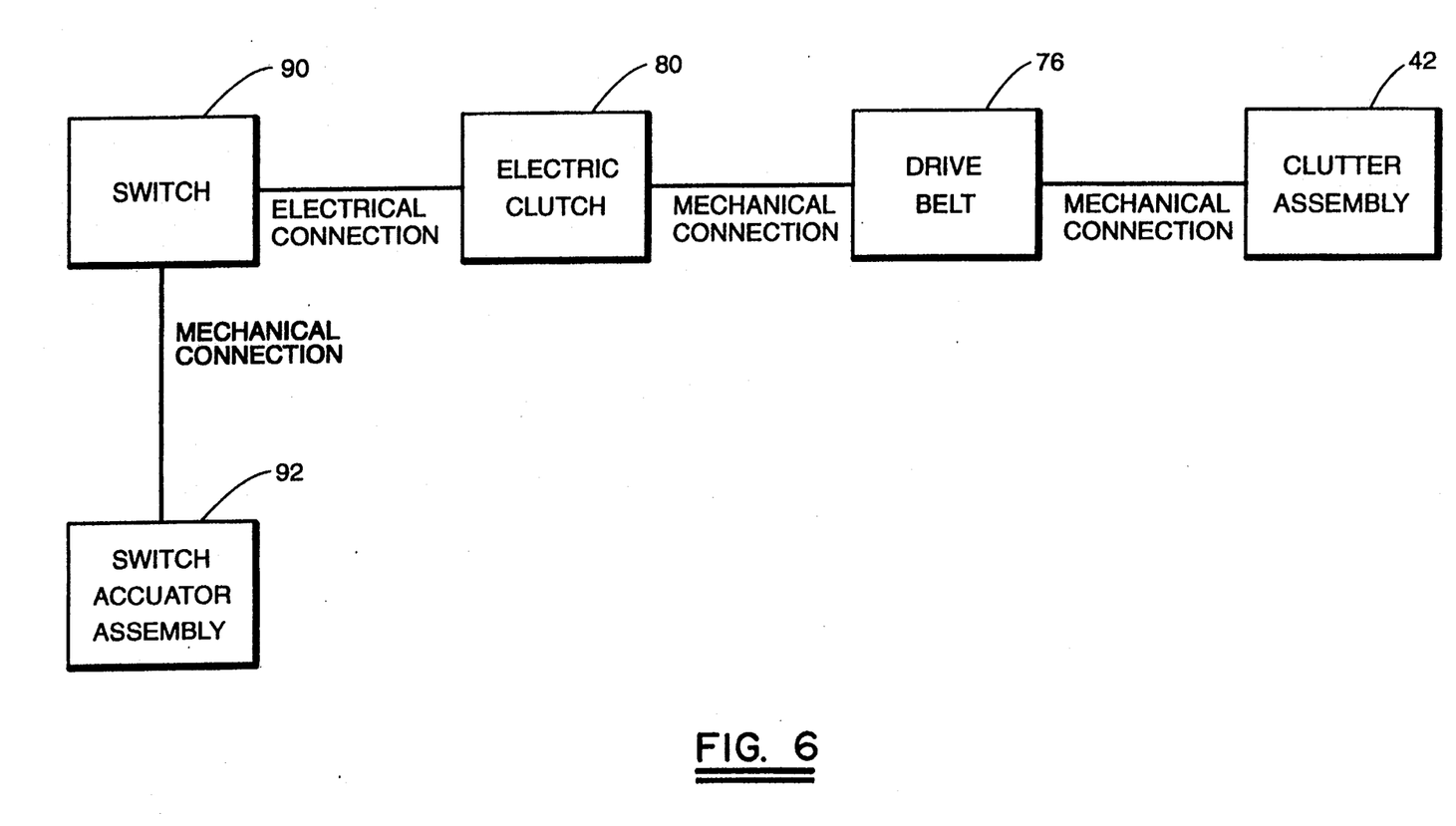
FIG. 6 is a block diagram representing the interaction of various components of the present riding lawn mower.

With reference now to FIG. 6, it is shown a block diagram representation that the kill switch assembly 92 is mechanically connected to the electric lever switch 90 which in turn is electrically connected to the electric clutch 80. The electric clutch 80 is, in turn, mechanically connected to the drive belt 76 which in turn is mechanically connected to the mower blades contained within the cutter assembly 42. As the actuator 44 for the lifting mechanism 40 is activated to retract the mower cutter assembly 42, the drive bar 68 will begin to move upwardly. As the drive bar 68 moves upwardly, plunger rod 102 will similarly move upwardly until the adjustable collar 104 hits the lower open end 96 of the J-shaped tube member 94. As the drive bar continues its upward ascent, the tube member 94 will move upwardly through the housing 88 until the J-shaped end 98 of the tube member 94 engages the electric lever switch 90. Shortly thereafter the switch 90 will be flipped by the J-shaped end 98 to an open condition thus disengaging the clutch 80. As the electric clutch 80 disengages, drive power will be removed from the drive belt 76 and the mower blades in the cutter assembly 42 will discontinue their rotation. The kill switch assembly 92 thus provides a safety feature to the riding mower 10 so that when the cutter assembly 42 is moved above ground level, away from its cutting position, the blades therein are stopped from further rotation.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those of skill in the art without departing from the scope and spirit of this invention, as defined in the following claims.

What is claimed is:

1. A vehicle frame for a riding lawn mower, said frame comprising:
    a pair of substantially horizontal, oppositely opposed support rails extending along a substantial portion of the vehicle frame, each of the rails having a front end and a rear end;
    a rear support member fixedly secured to the rear end of each of the support rails, said rear support member having a first end and a second end;
    a front support member fixedly secured to the front end of each of the support rails, said front support member having a first end and a second end;
    a rear motor deck rotatably connected to said rear support member;
    a front wheel assembly connected to said front support member, said front wheel assembly having a pair of front wheels each having a central hub;
    a rear wheel assembly connected to said rear motor deck, said rear wheel assembly having rear axle means and a pair of rear wheels secured thereto;
    articulating pantograph means for supporting a mower cutter assembly, said articulating pantograph means being linked at one end between said front support member and said rear support member, and at another end thereof to the mower cutter assembly; and
    actuator means being connected to said articulating pantograph means for extending and retracting the mower cutter assembly relative to the vehicle frame so that the mower cutter assembly is movable between a cutting position proximate ground level and a fully retracted position above said rear axle means and central hubs of the front wheels.

2. The lawn mower frame according to claim 1 wherein said front support member is substantially parallel to said rear support member with the first end of said front support member and the first end of said rear support member being on a first common perpendicular, and the second end of said front support member and the second end of said rear support member being on a second common perpendicular.

3. The lawn mower frame according to claim 2 wherein said articulating pantograph means for supporting the mower cutter assembly includes:
- a first pair of rods being hinged together at approximately their respective mid-points, each rod of the first pair having an upper end and a lower end relative to the mower frame, the upper end of one of the rods of said first pair being hinged to the first end of said rear support member and the upper end of the other rod of said first pair of rods being hinged to the first end of said front support member; and
- a second pair of rods being hinged together at approximately their respective mid-points, each rod of the second pair having an upper end and a lower end relative to the mower frame, the upper end of one of the rods of said second pair being hinged to the second end of said rear support member and the upper end of the other rod of said second pair of rods being hinged to the second end of said front support member with the mower cutter assembly being suspended from the lower ends of the rods.

4. The lawn mower frame according to claim 3 wherein said articulating pantograph means further includes a drive bar connected between the lower ends of the rods proximate the front of the riding lawn mower.

5. The lawn mower frame according to claim 4 wherein said actuator means includes a hand-activated worm screw crank connected at one end to said drive bar, the other end of said hand-activated worm screw crank being located so that a person seated on the mower can comfortably reach the crank to move the cutter assembly between the cutting position and the fully retracted position.

6. The lawn mower frame according to claim 4 wherein said actuator means includes an electric worm screw crank connected at one end to said drive bar, the other end of said electric worm screw crank being located so that a person seated on the mower can comfortably reach a control to activate the crank to move the cutter assembly between the cutting position and the fully retracted position.

7. The lawn mower frame according to claim 4 further including an electric clutch engaged with a drive shaft extending from a motor secured to said motor deck, said electric clutch connected to a drive wheel that drives cutting blades contained within said mower cutter assembly.

8. The lawn mower frame according to claim 7 further including means for disengaging said electric clutch so that drive power is removed from said cutting blades when said mower cutter assembly reaches a predetermined height above ground level.

9. The lawn mower frame according to claim 8 wherein said means for disengaging said electric clutch includes:
- a switch electrically connected to said electric clutch, said switch being comfortably reachable for a person seated on the mower;
- a J-shaped tube member having an open end and a J-shaped end, the tube member being suspended downwardly so that the J-shaped end is positioned proximate said switch and the open end is positioned above said drive bar;
- a plunger rod connected to said drive bar and upwardly directed therefrom into the tube member through the open end thereof; and
- an adjustable collar positioned around said plunger rod at a predetermined point so that when said actuator means is activated to move said mower cutter assembly toward said fully retracted position, said adjustable collar will engage the open end of said J-shaped tube member thereby moving the J-shaped end thereof into contact with said switch to disengage said electric clutch so that power is removed from said cutting blades when said mower cutter assembly reaches said predetermined height above ground level.

10. The lawn mower frame according to claim 8 further including a frame axle rotatably secured within said rear support member and wherein said rear motor deck includes a pair of side extension arms secured to said frame axle so that when said mower cutter assembly is moved toward said fully retracted position, said rear motor deck will rotate downwardly to allow the cutter assembly to move upwardly, and to maintain vehicle stability by lowering the weight associated with the motor deck.

11. The lawn mower frame according to claim 8 further including a housing containing said means for disengaging said electric clutch and height indication means for indicating to an operator of the mower the height of said mower cutter assembly above ground level.

* * * * *